No. 734,654. PATENTED JULY 28, 1903.
A. ALLING.
TICKET CONTROL APPARATUS.
APPLICATION FILED APR. 25, 1902.
NO MODEL.
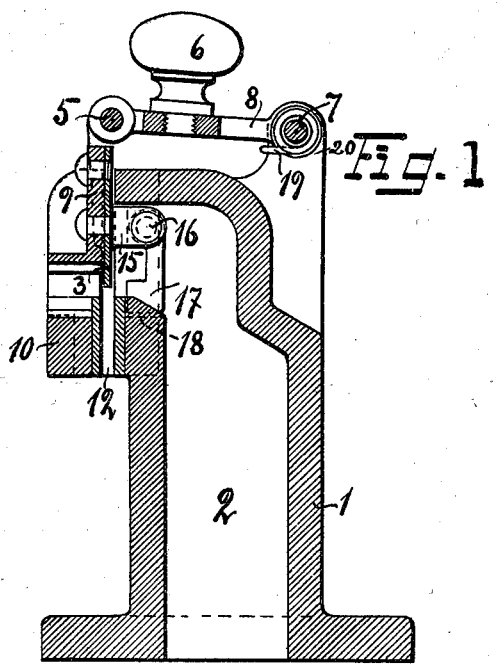
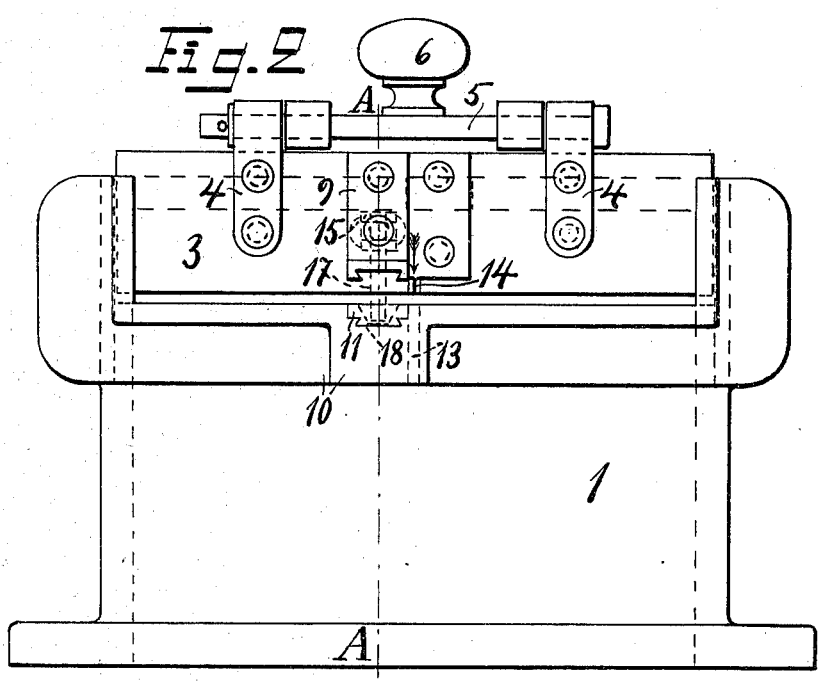
Witnesses
H. Everett Wade
C. A. Jarvis.
Inventor
Adolf Alling
By his Attorney
F. H. Richards.

No. 734,654. Patented July 28, 1903.

UNITED STATES PATENT OFFICE.

ADOLF ALLING, OF SALTSJÖBADEN, SWEDEN.

TICKET-CONTROL APPARATUS.

SPECIFICATION forming part of Letters Patent No. 734,654, dated July 28, 1903.

Application filed April 25, 1902. Serial No. 104,616. (No model.)

*To all whom it may concern:*

Be it known that I, ADOLF ALLING, a subject of the King of Sweden and Norway, residing at Saltsjöbaden, in the Kingdom of Sweden, have invented certain new and useful Improvements in Ticket-Control Apparatus, of which the following is a specification.

This invention relates to a device for dating and marking tickets and for retaining the return-coupons or the stub thereof.

The objects are to simultaneously date, mark, and retain the stubs of tickets, to prevent the use of the dating and marking mechanism except at the introduction of a ticket into the device, thus decreasing the liability of fraudulent manipulation, and to provide an inexpensive, practical, and durable structure.

Referring to the drawings, Figure 1 is an elevational view of the device taken on the line A A of Fig. 2, which is a view in elevation; and Fig. 3 illustrates a ticket.

Similar characters of reference indicate like parts throughout the figures.

The apparatus comprises a standard 1, provided with a channel or conduit 2 for the reception of coupons or stubs, the mouth of which is normally partially closed by a chopper 3, carried by hangers 4, loosely mounted upon stud 5, secured to a plate 8, which is journaled at 7 to a web 20, branching from said standard.

The chopper 3, adapted to operate as a chopper for the tickets, has secured to it a dating-stamp supporter 9, to which may be secured the matrix of the stamp, and in like manner is also affixed to said chopper a device 14 for marking, designating, or perforating upon the ticket certain characters or stations.

Secured to the rear of the chopper 3 is a member 15, preferably forked or bifurcated, and in which is mounted, by means of a spindle 16, a tumbler 17, which normally remains in a vertical position resting upon a shoulder 18, formed on the lower portion of the mouth of the receptacle, whereby to maintain the chopper and mechanism carried thereby in an elevated position and against a descending movement except at the introduction of a ticket into the device, which forces the tumbler beyond the wall of the receptacle, which releases the mechanism from its locked position.

For the purpose of automatically elevating the chopper to its normal position when it has been forced downward a spring 19 is provided and which is preferably spiraled around the shaft 7, which is supported by the web 20, and this spring elevates the plate 8, by which the chopper is supported, said plate being provided with a pounding-knob 6.

Projecting outwardly from the standard 1 is a rest 10, adapted at its upper portion to receive a platen for the stamp, which is preferably fitted into an opening or socket 11, formed in the upper portion of said rest 10, and the rest is also provided with an elongated passage 12 for the reception of the chopper when the latter is lowered in the operation of dissecting a ticket and also with a perforation 13, adapted to take the end of a punch, which may be carried by said chopper.

It will now be seen that the introduction of a ticket into the slot formed by the lower extremity of the chopper and the top of the rest will cause the tumbler to move back and pass beyond the mouth of the receptacle, whereby the entire ticket dating, marking, and chopping mechanism may be lowered onto and through the ticket. It will further be noted that the distance between the lower extremity or the knife-edge of the chopper and the top of the rest is only sufficient to admit the passage of a ticket and that in this way the use of the device for fraudulent purposes is rendered highly difficult.

It will be observed that in introducing a ticket into the slot it may be placed in any position to receive the mark or perforation at any point desired and that at the same time the punch operates the ticket is also stamped, and the coupon or stub is likewise chopped therefrom, the latter tumbling into the receptacle. It will be further observed that the lower edge of the chopper may be preferably sharpened, so as to conveniently chop the ticket, and that also the marking device may be provided with two different dies, so that the marks made upon the ticket to be sold and that to be retained may be of a different character. This is especially desirable in cases where it is necessary to separate the return-coupon from the single-trip ticket in order to distinguish which is which.

It is to be understood that variations within the purview of this invention may be resorted to and that the device may be arranged for use in connection with various kinds of tickets.

Having thus described my invention, I claim—

1. A device for dating and marking tickets and detaching portions therefrom, comprising a support provided with a receptacle and a pair of slides, a chopper movable in said slides, a dating and marking mechanism operative in conjunction with said chopper, a spring-actuated pounder connected to said chopper and a tumbler for locking said chopper in elevation, said tumbler being releasable by the ticket.

2. A device for dating tickets comprising a support provided with vertical slides, a dating member movable in said slides, a spring-actuated pounder connected to said movable member, a tumbler adapted to lock said member in elevation and releasable by the ticket and a platen carried by said support.

3. A device for dating and marking tickets comprising a support provided with a pair of vertical slides, a member adapted to reciprocate in said slides, a lock carried by said member and releasable only by the ticket, a spring-actuated pounder connected to said member, and dating and marking mechanism carried by said reciprocating member.

4. A device for dating and marking tickets and detaching portions therefrom, comprising a support provided with a receptacle and a pair of slides, a member comprising a chopper movable in said slides, a lock carried by said member and releasable by the ticket, dating and marking mechanism operative in conjunction with said movable member, and a spring-actuated pounder connected to said member.

In witness whereof I have hereunto set my hand in presence of two witnesses.

ADOLF ALLING.

Witnesses:
AUG. HAGELIN,
J. F. A. RUTBÄCK.